United States Patent
Kim et al.

(10) Patent No.: US 12,521,011 B2
(45) Date of Patent: Jan. 13, 2026

(54) METHOD AND SYSTEM FOR DETERMINING PATHOLOGIC MYOPIA BY USING GEOMETRIC STRUCTURE OF FUNDUS POSTERIOR SCLERA

(71) Applicant: THE CATHOLIC UNIVERSITY OF KOREA INDUSTRY-ACADEMIC COOPERATION FOUNDATION, Seoul (KR)

(72) Inventors: Yong Chan Kim, Seoul (KR); Dong Jin Chang, Seoul (KR); So Jin Park, Seoul (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 530 days.

(21) Appl. No.: 18/014,026

(22) PCT Filed: Jun. 23, 2021

(86) PCT No.: PCT/KR2021/007870
§ 371 (c)(1),
(2) Date: Dec. 30, 2022

(87) PCT Pub. No.: WO2022/025437
PCT Pub. Date: Feb. 3, 2022

(65) Prior Publication Data
US 2023/0284900 A1    Sep. 14, 2023

(30) Foreign Application Priority Data
Jul. 28, 2020    (KR) .................. 10-2020-0093506

(51) Int. Cl.
*A61B 3/12* (2006.01)
*A61B 3/00* (2006.01)
(Continued)

(52) U.S. Cl.
CPC .............. *A61B 3/12* (2013.01); *A61B 3/0025* (2013.01); *A61B 3/102* (2013.01); *G06F 18/2411* (2023.01); *G16H 50/20* (2018.01)

(58) Field of Classification Search
CPC ........... A61B 3/12; A61B 3/14; A61B 3/0025; A61B 3/102; A61B 3/1005; G16H 50/30; G16H 50/50; G16H 50/70
(Continued)

(56) References Cited

U.S. PATENT DOCUMENTS

| 2012/0182520 A1 | 7/2012 | Neitz et al. |
| 2013/0222767 A1 | 8/2013 | Cheng et al. |

(Continued)

FOREIGN PATENT DOCUMENTS

| JP | 5667730 B1 | 2/2015 |
| JP | 2019-170706 A | 10/2019 |

(Continued)

OTHER PUBLICATIONS

Kim, Yong et al. The Location of the Deepest Point of the Eyeball Determines the Optic Disc Configuration. Nature Scientific Reports, vol. 7, Article No. 5881, Jul. 19, 2017, [online], [retrieved on Aug. 29, 2025]. Retrieved from the Internet <URL: https://www.nature.com/articles/s41598-017-06072-8> (Year: 2017).*

(Continued)

*Primary Examiner* — Bumsuk Won
*Assistant Examiner* — Seth D Moser
(74) *Attorney, Agent, or Firm* — The PL Law Group, PLLC

(57) ABSTRACT

A method of determining pathologic myopia by using the geometric structure of a posterior sclera of a fundus includes obtaining geometric location data about a fovea, an optic disc, and a deepest point of the eye (DPE) in the posterior sclera of the fundus; obtaining an elevation difference (Continued)

$TEPS_{fovea-DPE}$ between the fovea and the DPE, an elevation difference $TEPS_{disc-DPE}$ between the optic disc and the DPE, and an elevation difference $TEPS_{fovea-disc}$ between the fovea and the optic disc by using location information about the fovea, the optic disc, and the DPE in the posterior sclera; and determining pathologic myopia by using at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc.

8 Claims, 12 Drawing Sheets

(51) Int. Cl.
 *A61B 3/10* (2006.01)
 *G06F 18/2411* (2023.01)
 *G16H 50/20* (2018.01)
(58) Field of Classification Search
 USPC .................................................. 351/205, 206
 See application file for complete search history.

(56) References Cited

U.S. PATENT DOCUMENTS

| 2014/0268046 | A1* | 9/2014 | Narasimha-Iyer | G06T 5/70 |
| | | | | 351/246 |
| 2015/0342451 | A1* | 12/2015 | Reisman | A61B 3/14 |
| | | | | 351/246 |
| 2017/0049314 | A1* | 2/2017 | Nakagawa | G06T 11/206 |
| 2020/0221947 | A1* | 7/2020 | Mino | A61B 3/0025 |
| 2023/0337908 | A1* | 10/2023 | Nakazawa | G16H 40/63 |

FOREIGN PATENT DOCUMENTS

| KR | 10-2019-0089471 A | 7/2019 |
| KR | 10-2019-0112493 A | 10/2019 |
| KR | 10-2020-0072127 A | 6/2020 |

OTHER PUBLICATIONS

International Search Report for PCT/KR2021/007870 mailed on Oct. 25, 2021.

* cited by examiner

FIG 10.

| Variables | Overall (n=860) | Healthy myopia eyes | Pathologic myopia eyes | P Value† |
|---|---|---|---|---|
| TEPS, μm | 258.30 ± 307.00 | 257.50 ± 200.64 | 262.74 ± 628.17 | 0.924 |
| TEPS, μm | 393.25 ± 192.42 | 351.46 ± 115.36 | 623.72 ± 325.12 | <0.001 |
| TEPS, μm | 134.95 ± 226.99 | 93.96 ± 133.42 | 360.99 ± 422.19 | <0.001 |
| TEPS, μm | 3344.91 ± 1481.59 | 3270.49 ± 1420.51 | 3755.33 ± 1730.64 | 0.002 |
| AxL, mm | 26.00 ± 1.61 | 25.68 ± 1.23 | 27.75 ± 2.25 | <0.001 |
| SCT, μm | 243.12 ± 106.61 | 256.28 ± 102.40 | 170.53 ± 100.31 | <0.001 |

FIG 11.

| Model | Variables | Predicted | Actual Classes Healthy | Actual Classes PM | Accuracy | Sensitivity | Specificity | AUROC |
|---|---|---|---|---|---|---|---|---|
| 1 | TEPS tasa_oct & | Healthy | 189 | 9 | 85.27% | 77.50% | 86.70% | 82.16% |
|   |   | PM | 29 | 31 |   |   |   |   |
| 2 | TEPS tasa_oct & | Healthy | 177 | 9 | 80.66% | 77.50% | 81.19% | 79.35% |
|   |   | PM | 41 | 31 |   |   |   |   |
| 3 | TEPS asa_oct & | Healthy | 190 | 9 | 85.66% | 77.50% | 87.16% | 82.33% |
|   |   | PM | 28 | 31 |   |   |   |   |
| 4 | TEPS asa_oct & | Healthy | 190 | 14 | 83.72% | 65.50% | 87.16% | 76.09% |
|   |   | PM | 28 | 26 |   |   |   |   |
| 5 | TEPS asa_oct & | Healthy | 189 | 9 | 85.27% | 77.50% | 86.70% | 82.10% |
|   |   | PM | 29 | 31 |   |   |   |   |
| 6 | TEPS asa_oct & | Healthy | 201 | 21 | 86.45% | 47.50% | 92.20% | 69.85% |
|   |   | PM | 17 | 19 |   |   |   |   |
| 7 | 4 TEPS variables | Healthy | 192 | 9 | 85.27% | 77.50% | 88.07% | 82.79% |
|   |   | PM | 26 | 31 |   |   |   |   |
| 8 | AL | Healthy | 178 | 14 | 77.52% | 65.00% | 79.82% | 72.41% |
|   |   | PM | 44 | 26 |   |   |   |   |
| 9 | CT | Healthy | 165 | 15 | 73.64% | 62.50% | 75.69% | 69.09% |
|   |   | PM | 53 | 25 |   |   |   |   |
| 10 | AL & CT | Healthy | 167 | 10 | 76.36% | 75.00% | 76.61% | 75.80% |
|   |   | PM | 51 | 30 |   |   |   |   |
| 11 | All variables | Healthy | 200 | 7 | 90.31% | 82.50% | 91.74% | 87.12% |
|   |   | PM | 18 | 33 |   |   |   |   |

FIG 12.

| Model | Predicted | Actual Classes | | Accuracy | Sensitivity | Specificity | AUROC |
|---|---|---|---|---|---|---|---|
| | | Healthy | PM | | | | |
| Kernel SVM | Healthy | 200 | 7 | 90.31% | 82.50% | 91.74% | 87.12% |
| | PM | 18 | 33 | | | | |
| Decision Tree | Healthy | 202 | 8 | 90.70% | 80.00% | 92.66% | 86.33% |
| | PM | 16 | 32 | | | | |
| Random Forest | Healthy | 204 | 10 | 90.70% | 75.00% | 93.58% | 84.29% |
| | PM | 14 | 30 | | | | |
| KNN | Healthy | 193 | 10 | 86.43% | 75.00% | 88.53% | 81.77% |
| | PM | 25 | 30 | | | | |
| Naïve Bayes | Healthy | 197 | 9 | 88.37% | 77.50% | 90.37% | 83.93% |
| | PM | 21 | 31 | | | | |

METHOD AND SYSTEM FOR DETERMINING PATHOLOGIC MYOPIA BY USING GEOMETRIC STRUCTURE OF FUNDUS POSTERIOR SCLERA

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/007870, filed Jun. 23, 2021, which claims priority to the benefit of Korean Patent Application No. 10-2020-0093506 filed in the Korean Intellectual Property Office on Jul. 28, 2020, the entire contents of which are incorporated herein by reference.

BACKGROUND

1. Technical Field

The present disclosure relates to pathological myopia determination, and more particularly, to a method and system for determining pathological myopia by using the geometric structure of the posterior sclera of the fundus.

2. Background Art

Vision loss due to pathological myopia is a global threat. It is necessary to accurately identify which ones among patients with high myopia develop into pathological myopia. Pathological myopia is known to increase the risk of visual impairment. However, the definition of pathological myopia is very vague, because there are no quantitative indicators. Accurately identifying which patients develop into pathological myopia is a challenge for ophthalmologists because there are no quantitative standards.

A general method of diagnosing pathological myopia is a comparison between standard photographs and clinical experience. Qualitative analysis by subjective pattern recognition can be biased by personal experience. Recently, attempts have been made to classify pathological myopia by the shapes of fundus pictures. However, this qualitative classification has limitations because it depends on the subjectivity of a discriminator. An axial length (AxL) and diopter measurements have limited discrimination because they measure the length of the entire eyeball instead of measuring a posterior globe, posterior sclera, or posterior pole, which is a problem of pathological myopia.

SUMMARY

Provided is a method and system for determining pathological myopia by using the geometric structure of the posterior sclera of the fundus, by which a determination as to whether a patent has pathological myopia may be quantitatively made using the geometric structures of the fovea, the optic disc, and the deepest point of the eye (DPE) in the posterior sclera of the fundus.

According to an aspect of the present disclosure, a method of determining pathologic myopia by using the geometric structure of a posterior sclera of a fundus includes obtaining geometric location data about a fovea, an optic disc, and a deepest point of the eye (DPE) in the posterior sclera of the fundus; obtaining an elevation difference $TEPS_{fovea-DPE}$ between the fovea and the DPE, an elevation difference $TEPS_{disc-DPE}$ between the optic disc and the DPE, and an elevation difference $TEPS_{fovea-disc}$ between the fovea and the optic disc by using location information about the fovea, the optic disc, and the DPE in the posterior sclera; and determining pathologic myopia by using at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc.

The method may further include obtaining a vertical distance $TEPS_{distance}$ from the optic disc to the DPE; and determining pathologic myopia by using at least two elevation differences selected from among the elevation difference $TEPS_{fovea-DPE}$ between the fovea and the DPE, the elevation difference $TEPS_{disc-DPE}$ between the optic disc and the DPE, the elevation difference $TEPS_{fovea-disc}$ between the fovea and the optic disc, and the vertical distance $TEPS_{distance}$ from the optic disc to the DPE.

The obtaining of the geometric location of the fovea includes performing a coronal scan for scanning coronal sections of the posterior sclera from the cornea of an eyeball toward the optic nerve, a horizontal scan for scanning horizontal surfaces of the posterior sclera that form a right angle with the coronal sections, and a vertical scan for scanning vertical surfaces of the posterior sclera that form a right angle with the coronal sections; and designating, as the location of the fovea, a coronal section when double humps appear simultaneously on three screens respectively obtained through the coronal scan, the horizontal scan and the vertical scan.

The obtaining of the geometric location of the optic disc includes performing a coronal scan for scanning coronal sections of the posterior sclera from the cornea of an eyeball toward the optic nerve, a horizontal scan for scanning horizontal surfaces of the posterior sclera that form a right angle with the coronal sections, and a vertical scan for scanning vertical surfaces of the posterior sclera that form a right angle with the coronal sections; and setting both sides of the optic disc, based on a Bruch's membrane opening (BMO), and designating the center of a straight line connecting the BMO as the location of the optic disc.

The obtaining of the geometric location of the DPE includes performing a coronal scan for scanning coronal sections of the posterior sclera from the cornea of an eyeball toward the optic nerve, a horizontal scan for scanning horizontal surfaces of the posterior sclera that form a right angle with the coronal sections, and a vertical scan for scanning vertical surfaces of the posterior sclera that form a right angle with the coronal sections; and designating, as the location of the DPE, a location when a hyper-reflective Bruch's membrane appears on all of three screens respectively obtained through the coronal scan, the horizontal scan, and the vertical scan.

The determining of the pathologic myopia includes determining whether a patient has pathologic myopia, by learning, through machine learning, at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc.

According to another aspect of the present disclosure, a system for determining pathologic myopia by using the geometric structure of a posterior sclera of a fundus includes a tomography unit configured to perform a coronal scan for scanning coronal sections of the posterior sclera from the cornea of an eyeball toward the optic nerve, a horizontal scan for scanning horizontal surfaces of the posterior sclera that form a right angle with the coronal sections, and a vertical scan for scanning vertical surfaces of the posterior sclera that form a right angle with the coronal sections; a structure location data collector configured to collect geometric locations of a fovea, an optic disc, and a deepest point of the eye (DPE) in the posterior sclera of the fundus by using images obtained by the tomography unit performing the coronal scan, the horizontal scan, and the vertical scan; a TEPS parameter calculator configured to calculate an elevation difference $TEPS_{fovea-DPE}$ between the fovea and the DPE, an elevation difference $TEPS_{disc-DPE}$ between the optic disc and the DPE, and an elevation difference $TEPS_{fovea-disc}$ between the fovea and the optic disc by using location information about the fovea, the optic disc, and the DPE in the posterior sclera; and a pathological myopia determiner configured to determine pathologic myopia by using at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc calculated by the TEPS parameter calculator.

The structure location data collector collects geometric locations of the fovea, the optic disc, and the DPE by designating, as the location of the fovea, a specific coronal section when double humps appear on three screens respectively obtained through the coronal scan, the horizontal scan, and the vertical scan at the same time, designating, as the location of the DPE, a location when a hyper-reflective Bruch's membrane appears on all of the three screens respectively obtained through the coronal scan, the horizontal scan, and the vertical scan, setting both sides of the optic disc, based on a Bruch's membrane opening (BMO), and designating the center of a straight line connecting the BMO as the location of the optic disc.

The pathological myopia determiner determines whether a patient has pathologic myopia, through machine learning by using, input parameters, at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc, which are calculated by the TEPS parameter calculator.

According to a method and system for determining pathological myopia by using the geometric structure of the posterior sclera of the fundus according to the present disclosure, development of a certain patient into pathological myopia may be accurately identified by using the geometric structures of the fovea, the optic disc, and the deepest point of the eye (DPE) in the posterior sclera of the fundus to predict presence of pathological myopia among various types of myopia.

In addition, according to the present disclosure, pathological myopia may be quantified using a tomography measurement-based data set for the posterior sclera of the fundus, and the pathological myopia may be categorized based on a combination of posterior sclera measurements and automatically and objectively classified through learning through an artificial intelligence (AI) algorithm.

Moreover, according to the present disclosure, progression or non-progression of pathological myopia may be accurately predicted through eyeball measurement based on optical coherence tomography (OCT) without clinical data such as the age, the eyesight, or other eyeball or systematic information of a patient. A high accuracy and an area under the receiver operating characteristic (AUROC) may be created through an RBF-kernel support vector machine (SVM) classifier by using only tomographic elevation of posterior sclera (TEPS) parameters ($TEPS_{fovea \rightarrow disc}$, $TEPS_{fovea \rightarrow HDPE}$, $TEPS_{disc \rightarrow HDPE}$, and $TEPS_{distance}$) representing a TEPS, and a superior discrimination ability than existing measurement methods, namely, an axial length (AxL) and a subfoveal choroidal thickness (SCT) may be provided.

Furthermore, an SVM classification method using six eyeball parameters including the TEPS parameters ($TEPS_{fovea \rightarrow disc}$, $TEPS_{fovea \rightarrow DPE}$, $TEPS_{disc \rightarrow DPE}$, and $TEPS_{distance}$) according to the present disclosure and the axial length (AxL) and the SCT corresponding to the existing measurement methods may provide high accuracy, well-balanced sensitivity, and specificity, compared with other machine learning algorithms.

BRIEF DESCRIPTION OF THE DRAWINGS

FIG. 10 is a table showing a comparison of six ocular measurement indices including four TEPS parameters (indices), an AxL, and an SCT, according to an embodiment of the present disclosure.

FIG. 11 is a table showing Accuracy, Sensitivity, Specificity, and AUROC of SVM classification for each of 11 models according to the present disclosure.

FIG. 12 is a table showing the performance of classification algorithm models of a Kernel SVM, a Decision Tree, a Random Forest, a KNN, and Naive Bayes by using 6 parameters.

DETAILED DESCRIPTION

The present disclosure will now be described more fully with reference to the accompanying drawings, in which exemplary embodiments of the present disclosure are shown. Configurations illustrated in the embodiments and the drawings described in the present specification are only the most preferred embodiment of the present disclosure and do not represent all of the technical spirit of the present disclosure, and thus it is to be understood that various equivalents and modified examples, which may replace the configurations, are possible when filing the present application.

The present disclosure proposes a new anatomical structure called a deepest point of an eyeball (DPE), and measures the geometrical structure of the posterior sclera of a fundus by using relative distances (depths) between the DPE, the fovea, and the optic disc. The fovea, the optic disc, and the DPE, which are the most prominent structures in the posterior sclera, may be referred to as landmarks representing the geometric structure of the posterior sclera. In the present disclosure, a tomographic elevation of posterior sclera (TEPS), which quantifies relative locations between the landmarks, is divided into four to express the posterior sclera. The present disclosure provides an artificial intelligence (AI) determination method and system for detecting pathological myopia by applying the TEPS index to a large number of myopia patients. Among the AI methods, a support vector machine (SVM) is particularly used, and the performance of the AI determination system is evaluated through a comparison between an axial length (AxL), which is currently used as an indicator of myopia, and a subfoveal choroidal thickness (SCT), which has recently been used a lot as a characteristic of pathological myopia.

Figure 1:
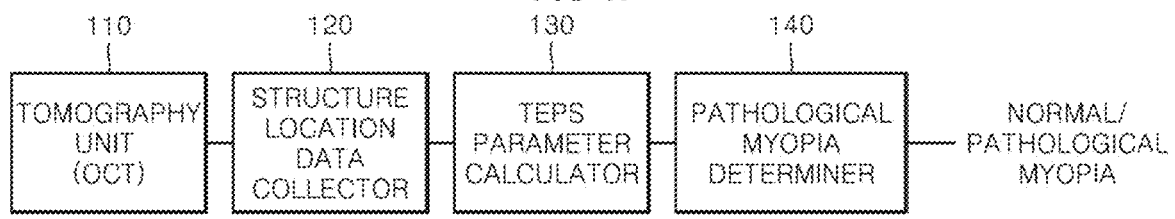
FIG. 1 is a block diagram showing a configuration of a pathological myopia determination system using the geometric structure of the posterior sclera of a fundus, according to an embodiment of the present disclosure.

FIG. 1 is a block diagram showing a configuration of a pathological myopia determination system using the geometric structure of the posterior sclera of a fundus, according to an embodiment of the present disclosure.

The pathological myopia determination system using the geometric structure of the posterior sclera of the fundus, according to an embodiment of the present disclosure, includes a tomography unit 110, a structure location data collector 120, a TEPS parameter calculator 130, and a pathological myopia determiner 140.

The tomography unit 110 performs a coronal scan for scanning coronal sections of the posterior sclera of the fundus from the cornea of an eyeball toward the optic nerve, a horizontal scan for scanning horizontal surfaces of the posterior sclera of the fundus that form a right angle with the coronal sections, and a vertical scan for scanning vertical surfaces of the posterior sclera of the fundus that form a right angle with the coronal sections. The tomography unit 110 may perform eyeball measurement based on an optical coherence tomography (OCT). For example, 256 B-scans (horizontal scans) about the fovea may be performed to provide an image of the posterior sclera with a width of 12 mm and a height of 9 mm. 1,000 consecutive coronal scan images may be reconstructed at intervals of 2.6 μm, and a good scan set with a signal quality index that exceeds 75 in a B-scan mode may be selected for further analysis.

Figure 2:
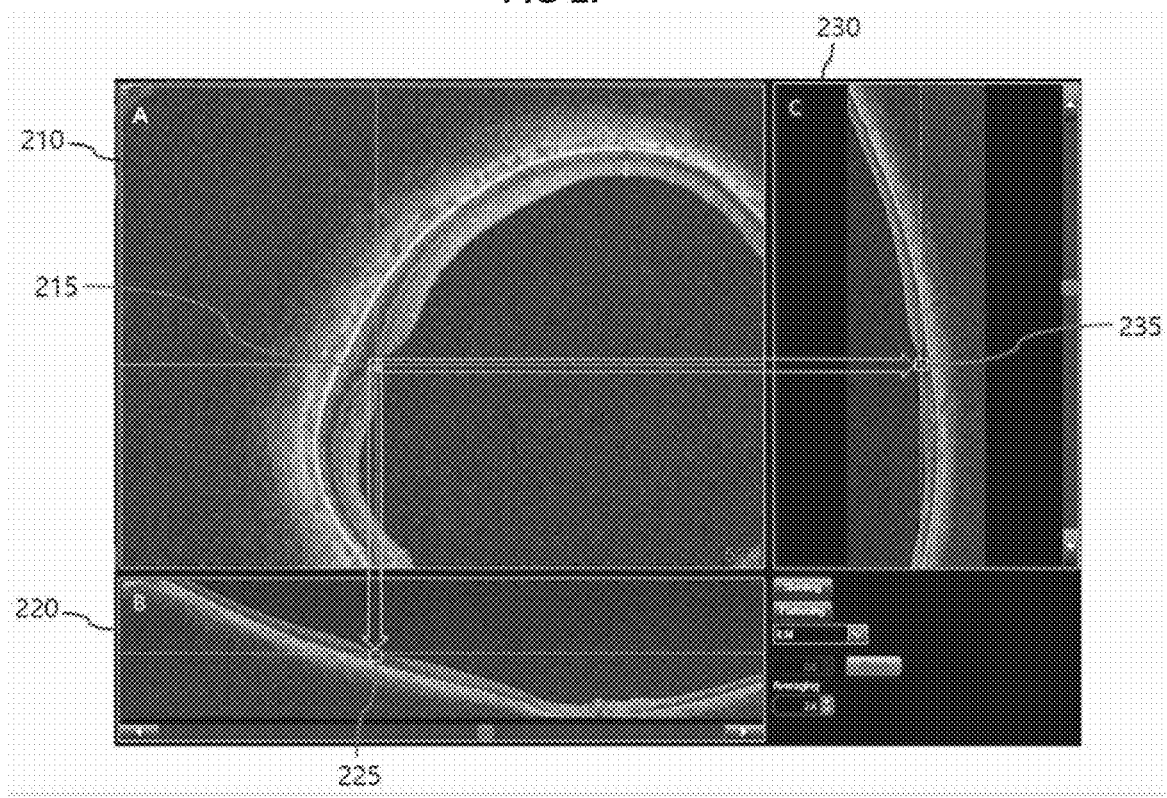
FIG. 2 is an image showing an example of geometrical positioning of a fovea.

The structure location data collector 120 collects geometric locations of the fovea, the optic disc, and the DPE in the posterior sclera of the fundus by using images obtained by the tomography unit 110 performing the coronal scan, the horizontal scan, and the vertical scan. The structure location data collector 120 may collect the geometric location of the fovea by designating, as the location of the fovea, a coronal section when double humps appear simultaneously on the three screens respectively obtained through the coronal scan, the horizontal scan and the vertical scan. FIG. 2 is an image showing an example of geometrical positioning of the fovea, and illustrates a coronal cross-sectional scan screen 210, a horizontal scan screen 220, and a vertical scan screen 230. By simultaneously examining the coronal scan screen 210, the horizontal scan screen 220, and the vertical scan screen 230 while checking reconfigured consecutive coronal cross-section scans (coronal mode, En-face mode) from the front (cornea side) to the rear (optic nerve side), a specific coronal section (indicated by green number '527' at a lower right corner of section A) when double humps 215, 225, and 235 appear on the three screens 210, 220, and 230 at the same time may be designated as the location (or height) of the fovea. The green number '527' represents a $527^{th}$ section out of 1,000 consecutive coronal cross-section scan (coronal mode, En-face mode) sections from the front (cornea) to the rear (optic nerve) at intervals of 2.6 μm.

Figure 3:
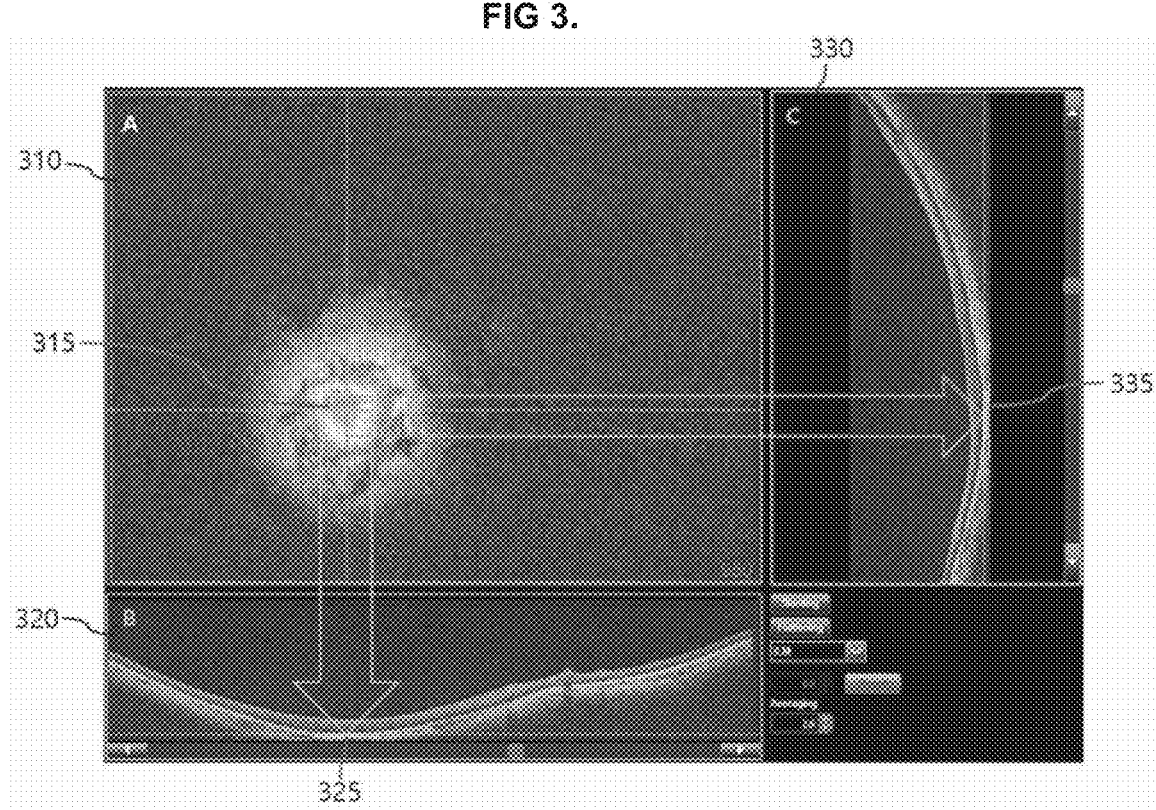
FIG. 3 is an image showing an example of geometrical positioning of a deepest point of the eye (DPE).

In addition, the structure location data collector 120 may collect the geometric location of the DPE by designating, as the location of the DPE, a location when a hyper-reflective Bruch's membrane appears on all of the three screens respectively obtained through the coronal scan, the horizontal scan, and the vertical scan. FIG. 3 is an image showing an example of geometrical positioning of the DPE, and illustrates a coronal cross-sectional scan screen 310, a horizontal scan screen 320, and a vertical scan screen 330. By simultaneously examining the coronal scan screen 310, the horizontal scan screen 320, and the vertical scan screen 330 while checking reconfigured consecutive coronal cross-section scans (coronal mode, En-face mode) from the front (cornea side) to the rear (optic nerve side), when a hyper-reflective Bruch's membrane (white rectangle) is shown on all of the three screens 310, 320, and 330, this location may be designated as the location of the DPE. In other words, a coronal section (indicated by green number '950' at the lower right corner of section A) when hyper-reflective Bruch's membranes (indicated by white rectangles 315, 325, and 335) are seen on all of the three screens 310, 320, and 330 may be designated as the location (or height) of the DPE. The green number '950' indicates a $950^{th}$ section out of 1,000 consecutive coronal cross-section scans (coronal mode, En-face mode) from the front (cornea) to the rear (optic nerve) at intervals of 2.6 μm.

Figure 4:
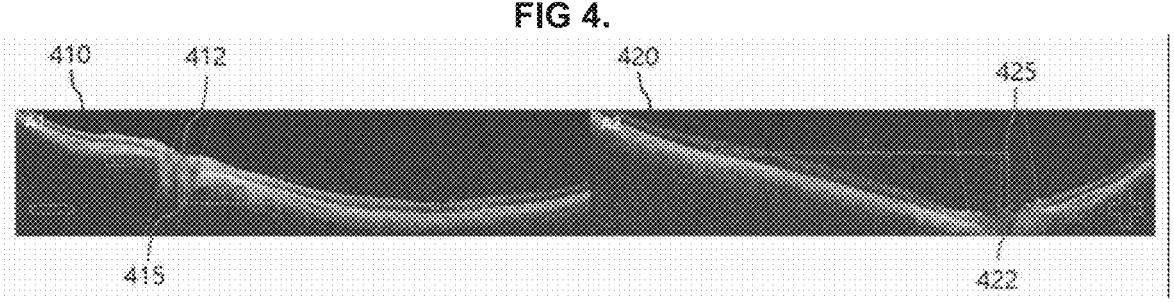
FIG. 4 shows an example of geometrical positioning of the optic disc and an elevation difference $TEPS_{fovea-disc}$ between the fovea and the optic disc.
Figure 5:
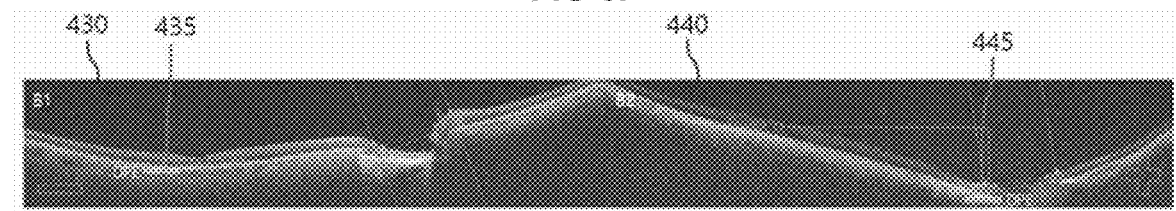
FIG. 5 illustrates an elevation difference $TEPS_{fovea-DPE}$ between the fovea and the DPE.

In addition, the structure location data collector 120 may set both sides of the optic disc, based on a Bruch's membrane opening (BMO), and may designate the center of a straight line connecting the BMO as the location of the optic disc, thereby collecting the designated geometric location of the optic disc. FIG. 4 shows an example of geometrical positioning of the optic disc and an elevation difference $TEPS_{fovea-disc}$ between the fovea and the optic disc. The location of the optic disc may be measured using an automatic segmentation algorithm using the BMO. (Green parallel lines dividing both sides of the optic disc in FIG. 4 based on BMO). The center of the optic disc may be designated as the center of the green straight line connecting the BMO (small red rectangles 412, 422, 452, and 462 in FIGS. 4, 5 and 6).

The TEPS parameter calculator 130 calculates an elevation difference $TEPS_{fovea-DPE}$ between the fovea and the DPE, an elevation difference $TEPS_{disc-DPE}$ between the optic disc and the DPE, and the elevation difference $TEPS_{fovea-disc}$ between the fovea and the optic disc by using geometric location information about the fovea, the optic disc, and the DPE in the posterior sclera. The TEPS parameter calculator 130 may further calculate a vertical distance $TEPS_{distance}$ from the optic disc to the DPE.

The elevation difference $TEPS_{fovea-disc}$ between the fovea and the optic disc, which is a tomographic rise from the fovea to the optic disc center (disc), may be indicated by arrow 415 in A1 (410) of FIG. 4 and arrow 425 in A2 (420) of FIG. 4. The elevation difference $TEPS_{fovea-DPE}$ between the fovea and the DPE, which is a tomographic rise from the fovea to the DPE, may be indicated by arrow 435 in B1 (430) of FIG. 5 and arrow 445 in B2 (440) of FIG. 5. The elevation difference TEPS$_{disc-DPE}$ between the optic disc and the DPE, which is a tomographic rise from the optic disc to the DPE, may be indicated by arrow 455 in C1 (450) of FIG. 6 and arrow 465 in C2 (460) of FIG. 6.

Figure 6:
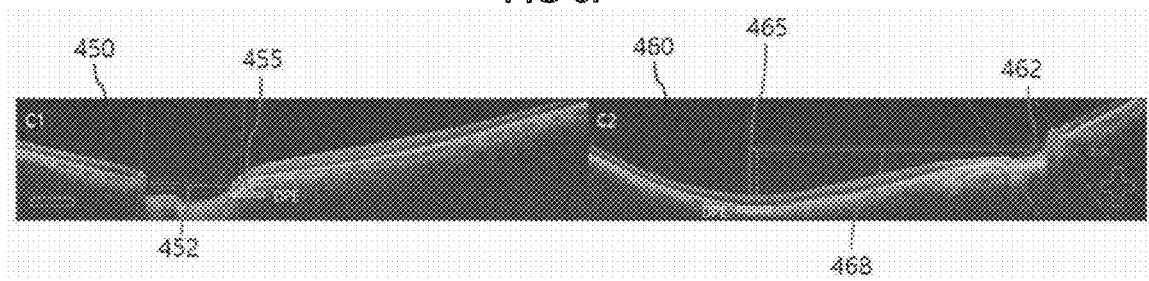
FIG. 6 illustrates an elevation difference $TEPS_{disc-DPE}$ between the optic disc and the DPE and a vertical distance $TEPS_{distance}$ between the optic disc and the DPE.

The vertical distance TEPS$_{distance}$ from the optic disc to the DPE is indicated by arrow 468 in C2 (460) of FIG. 6.

The TEPS may be estimated as the number of coronal sections from one landmark to another landmark. According to an embodiment of the present disclosure, each section is calculated at intervals of 2.6 µm, a posterior direction (optic disc direction) is designated as a positive TEPS (A2 (420), B2 (440), and C2 (460) in FIG. 4), and an anterior direction (cornea side) may be designated as a negative TEPS (A1 (410), B1 (430), and C1 (450) in FIGS. 4, 5 and 6). The vertical distance TEPS$_{distance}$ may be estimated by measuring a linear distance between landmarks in micrometers by using the unique caliper of DRIOCT software.

The pathological myopia determiner 140 determines pathological myopia by using at least two selected from the elevation difference TEPS$_{fovea-DPE}$ between the fovea and the DPE, the elevation difference TEPS$_{disc-DPE}$ between the optic disc and the DPE, and the elevation difference TEPS$_{fovea-disc}$ between the fovea and the optic disc, which are calculated by the TEPS parameter calculator 130. The pathological myopia determiner 140 may determine whether a patient has pathological myopia, through learning using, as input parameters, at least two of the elevation difference TEPS$_{fovea-DPE}$ between the fovea and the DPE, the elevation difference TEPS$_{disc-DPE}$ between the optic disc and the DPE, and the elevation difference TEPS$_{fovea-disc}$ between the fovea and the optic disc calculated by the TEPS parameter calculator 130.

When the vertical distance TEPS$_{distance}$ from the optic disc to the DPE is added to a TEPS parameter, the TEPS parameter calculator 130 may determine pathological myopia by using at least two of the elevation difference TEPS$_{fovea-DPE}$ between the fovea and the DPE, the elevation difference TEPS$_{disc-DPE}$ between the optic disc and the DPE, the elevation difference TEPS$_{fovea-disc}$ between the fovea and the optic disc, and the vertical distance TEPS$_{distance}$ between the optic disc and the DPE.

An embodiment of the present disclosure has been carried out for 860 people with an axial length of 24.0 mm or more. In the present disclosure, the definition of pathological myopia follows a definition suggested by the International Myopia Institute (IMI), and refers to myopia that may lead to visual loss due to excessive extension of the axial length associated with myopia and a structural change in the posterior sclera accompanied by the excessive extension. In more detail, the definition of pathological myopia refers to categories 2, 3, and 4 (regardless of presence or absence of a plus sign) of a Meta-Analysis for Pathologic Myopia (META-PM) classification system. (META-PM organized myopic maculopathy into 5 stages, category 0, no maculopathy; category 1, tessellated fundus; category 2, diffuse choroidal atrophy; category 3, patchy chorioretinal atrophy; and category 4, macular atrophy).

A configuration of a machine learning algorithm usable by the pathological myopia determiner 140 according to an embodiment of the present disclosure will be described. In an embodiment of the present disclosure, an SVM-based classification algorithm may be selected to construct a classification model based on a combination of the above-described TEPS parameters. In addition, a prediction model may be written based on a combination of the aforementioned parameters by a decision tree, a random forest, a nest neighbor (KNN), and a naive ayes classifier.

Data is divided into a 70% training set and a 30% test set. A class imbalance in a training set is a ratio of 84.7 to 15.3. To address the imbalance, individuals in a low subgroup are identified using a synthetic minority over-sampling technique (SMOTE), K-nearest neighbors (KNN) are found, and eventually a new dataset is written in the low subgroup. In this specific mode, K is set to be 5. After the SMOTE is performed, training data may include 970 eyes, which consist of 510 healthy eyes (52.6%) and 460 pathologic myopic eyes (47.4%). This training data may be used to retrain the model and construct a final prediction model. Independent validation has been performed on the original data by using the final training model.

A specific machine learning algorithm starts to be trained according to the above-described steps. First, two TEPS parameters may be selected from four TEPS parameters to establish an SVM classifier model (models 1-6). Second, an SVM model using all of the four TEPS parameters may be built (model 7). Third, the SVM model may be created using an AxL and an SCT (models 8, 9, and 10). Fourth, all six indices (parameters) may be used to build the SVM model (model 11). Finally, an SVM, a decision tree, a random forest, a KNN, and a naive ayes classifier may be built using all six indicators.

Prediction performance may be compared by calculating (1) Accuracy, namely, the overall accuracy of a model, and may be calculated as a value obtained by dividing a sum of correct classifications by the total number of classifications. The prediction performance may be represented by (2) a Sensitivity metric that evaluates the ability of a truly positive prediction model in each available category; (3) Specificity: an indicator evaluating the ability of a model to predict a true negation of each available category; (4) an area under the receiver operating characteristic curve (AUROC).

A support vector machine (SVM) structure used in an embodiment of the present disclosure will be described. A classification model used in analysis may use a nonlinear SVM methodology, which is most commonly used in nonlinear classification. The SVM is a supervised learning model in the machine learning field. The SVM is a method of searching for a hyperplane or a group of hyperplanes from a high-dimensional space and performing classification and regression.

When a training data set is given as below, the training data set may be expressed as in Equation 1.

$$D=\{(x_i, y_i), i=1, 2, \ldots n\} \quad \text{[Equation 1]}$$

where $y_i$ indicates an input vector having +1 and −1, and $x_i$ indicates a class label.

A hyperplane h(x) may be expressed as in Equation 2.

$$h(x) = w^T x + b = w_1 x_1 + w_2 x_2 + \ldots + w_d x_d b = 0 \quad \text{[Equation 2]}$$

where d indicates the number of dimensions and w indicates the weight vector of a d dimension.

Figure 7:
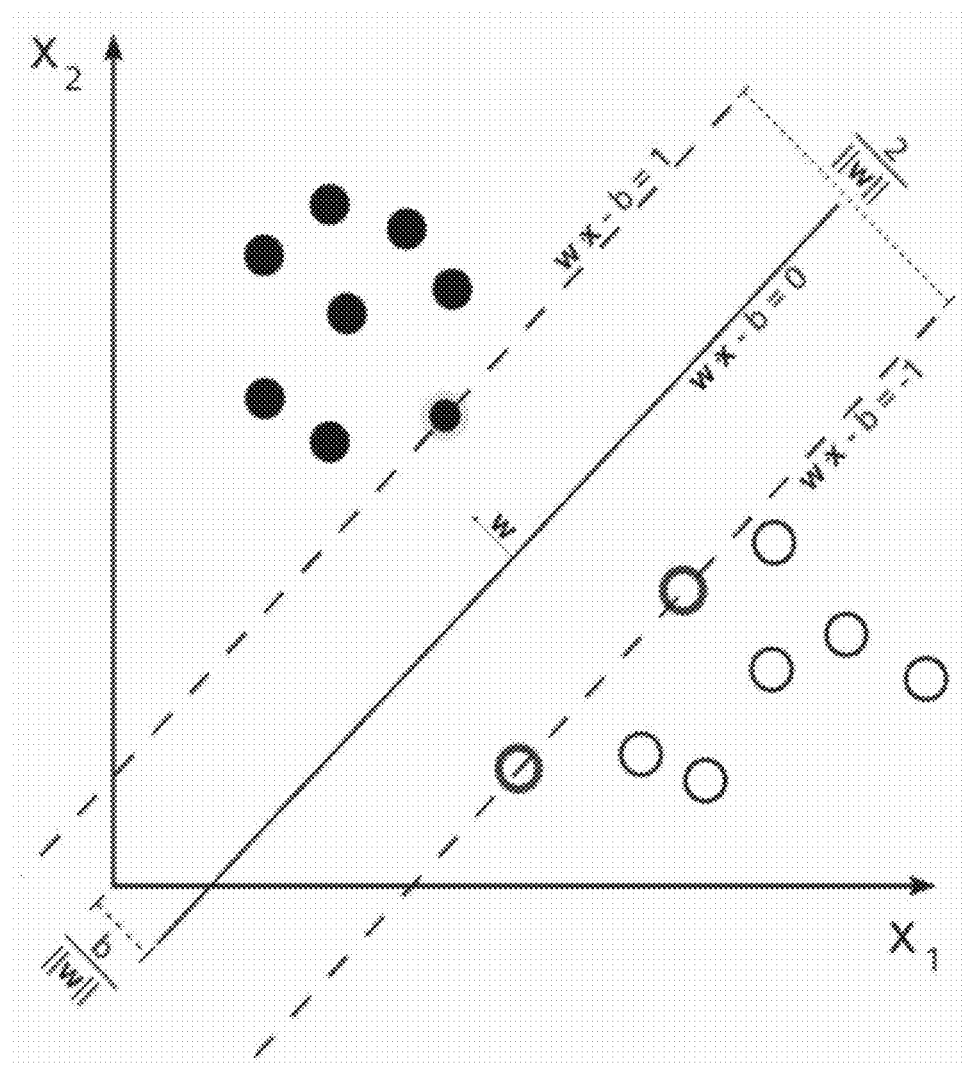
FIG. 7 illustrates a linear support vector machine (SVM) model.

FIG. 7 illustrates a linear SVM model.

When data is linearly separable, all points with h(x)<0 are classified as a cluster of −1, and points with h(x)>0 are classified as a cluster of +1, as shown in FIG. 2.

$$w^T x_i + b \geq +1 \text{ if } y_i = 1$$

$$w^T x_i + b \geq -1 \text{ if } y_i = -1 \quad \text{[Equation 3]}$$

A distance between the above two planes is referred to as a margin, and a maximum margin is expressed as $$\frac{2}{\|w\|}.$$

The ultimate goal of the SVM is to find w and b that maximize the margin.

The above two equations may be re-expressed as $$y_i(w^T x_i + b) \geq 1, i=1, \ldots n \quad \text{[Equation 4]}$$

In this case, a Kernel Method may be used to deal with data that is not linearly separable, and the basic idea is to perform linear separation by transforming a d dimension space into a d'(d'>d) dimension by using a mapping function Φ. A transformed training dataset may be defined as in Equation 5.

$$D_\Phi = \{(\Phi(x_i), y_i), i=1, 2, \ldots, n\} \quad \text{[Equation 5]}$$

After a linear decision surface is calculated in a d' dimension, the linear decision surface is mapped into a nonlinear surface in the original d dimension space. In this case, the linear decision surface in the d' dimension may be expressed as in Equation 6.

$$h(\Phi(x_m)) = W^T \cdot \Phi(x_m) + b \quad \text{[Equation 6]}$$

The linear decision surface may be expressed as $$W = \sum_{i=1}^{n} \alpha_i \Phi(x_i)$$

by a representer theorem (Wahba, 1990), and Equation 6 may be re-expressed as Equation 7.

$$f(x) = \sum_{i=1}^{n} \alpha_i \Phi(x_i)^T \cdot \Phi(x) + b,$$

$$0 < \alpha_i < C$$

(where C, which is Cost, indicates a function that determines how much a data sample is allowed to be placed in a different class. The smaller the C value, the more errors are allowed, and the larger the C value, the smaller the error. Thus, the possibility of overfitting is high.) In the case of a high dimension, the dot product of $\Phi(x_i)^T \cdot \Phi(x)$ is computationally expensive. To address this problem, when the dot product is calculated after applying mapping to two points p and q, the same result is obtained as when the square is taken after calculating the dot product of the original material.

$$\Phi(p)^T \cdot \Phi(q) = (p^T \cdot q)^2 \quad \text{[Equation 8]}$$

$K(x_i, x_j) = \Phi(x_i)^T \cdot \Phi(x_j)$ is referred to as a Kernel function. Although there are various types of kernel functions, a kernel type used in an analysis process according to the present disclosure uses a radial basis function (RBF), which is the most representative kernel. This is also referred to as a Gaussian Kernel.

$$K(x_i, x_j) = \exp(-r\|x_i - x_j\|^2) \quad \text{[Equation 9]}$$

In this case, r is related to the standard deviation of the Gaussian function, and as r is larger, it has a smaller standard deviation and has a smooth shape. In other words, as r is larger, there is a possibility of overfitting. In other words, according to an embodiment of the present disclosure, a nonlinear SVM analysis technique using an RBF kernel may be used as shown in the above equation.

Figure 8:
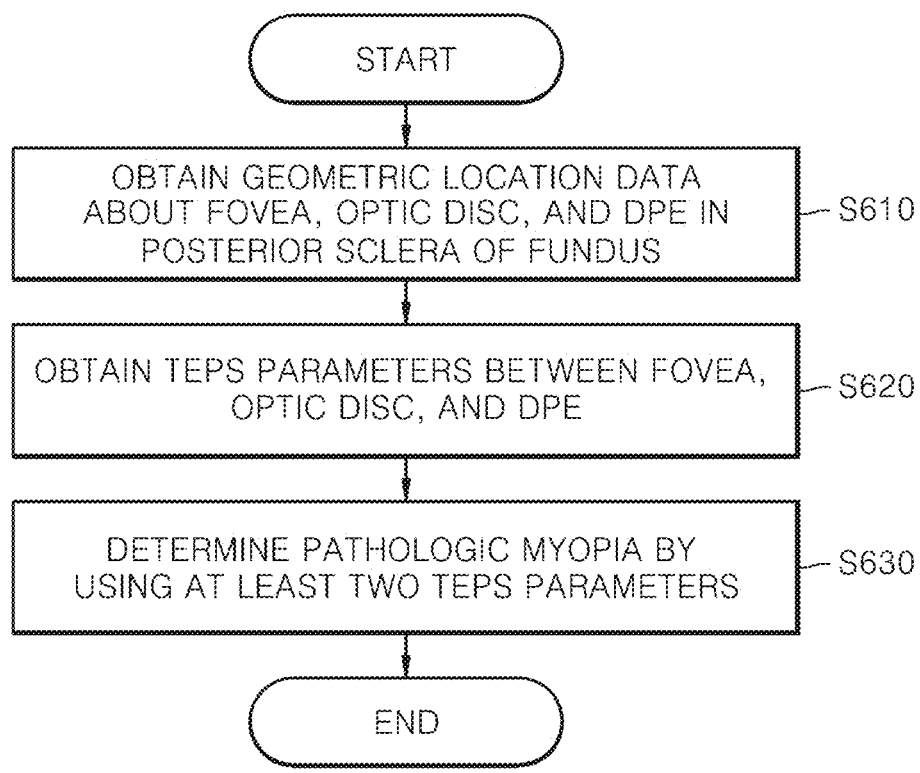
FIG. 8 is a flowchart of a pathological myopia determination system using the geometric structure of the posterior sclera of a fundus, according to an embodiment of the present disclosure.

FIG. 8 is a flowchart of a pathological myopia determination system using the geometric structure of the posterior sclera of a fundus, according to an embodiment of the present disclosure. The structure location data collector 120 obtains geometric location data about the fovea, the optic disc, and the DPE in the posterior sclera of a fundus (operation S610).

The TEPS parameter calculator 130 obtains an elevation difference $TEPS_{fovea-DPE}$ between the fovea and the DPE, an elevation difference $TEPS_{disc-DPE}$ between the optic disc and the DPE, and an elevation difference $TEPS_{fovea-disc}$ between the fovea and the optic disc by using location information about the fovea, the optic disc, and the DPE in the posterior sclera (operation S620)

The pathological myopia determiner 140 determines pathologic myopia by using at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc (operation S630).

Figure 9:
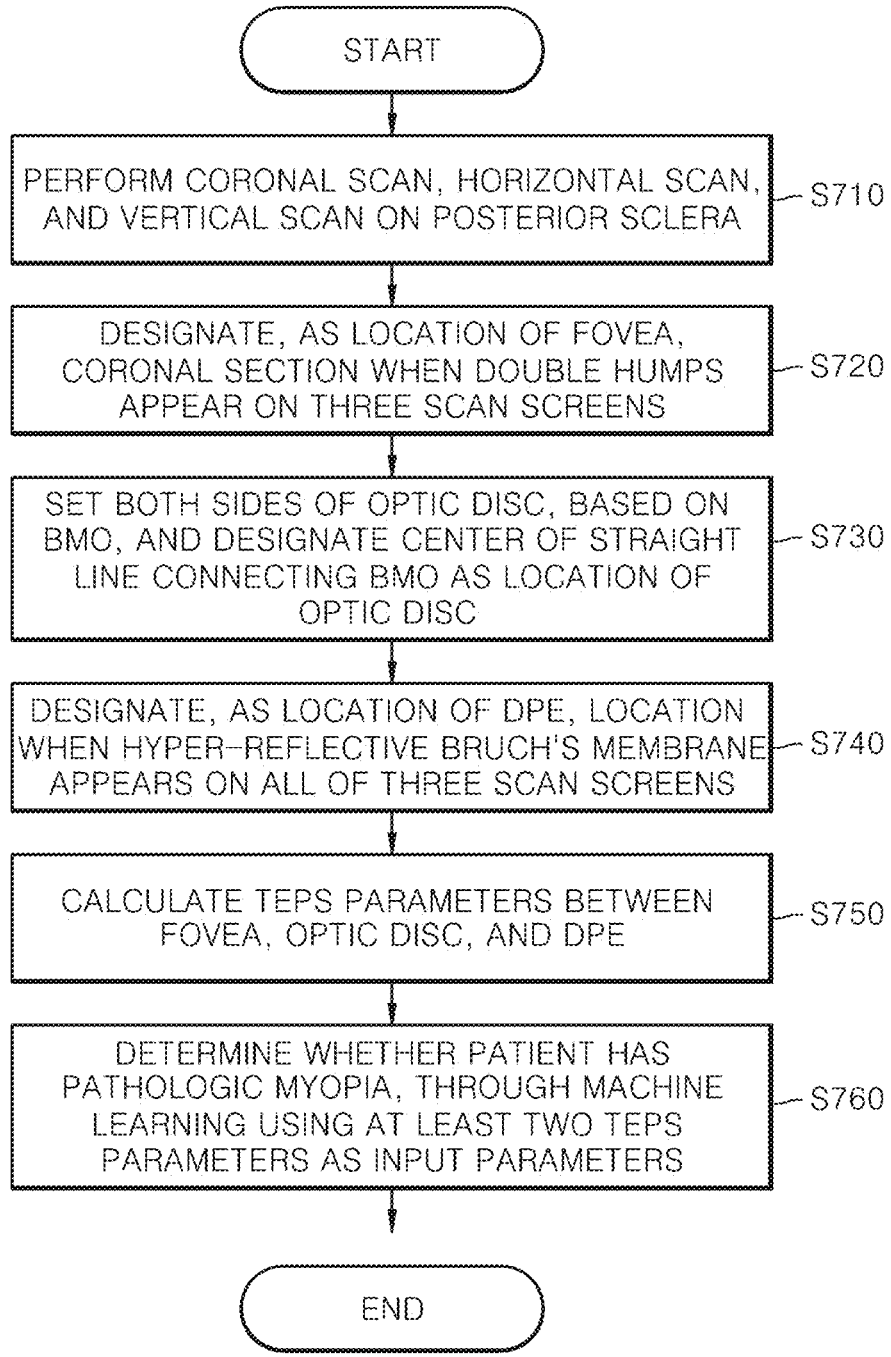
FIG. 9 is a flowchart illustrating in more detail a pathological myopia determination system using the geometric structure of the posterior sclera of a fundus, according to an embodiment of the present disclosure.

FIG. 9 is a flowchart illustrating in more detail a pathological myopia determination system using the geometric structure of the posterior sclera of a fundus, according to an embodiment of the present disclosure.

The tomography unit 110 performs a coronal scan for scanning coronal sections of the posterior sclera from the cornea of an eyeball toward the optic nerve, a horizontal scan for scanning horizontal surfaces of the posterior sclera that form a right angle with the coronal sections, and a vertical scan for scanning vertical surfaces of the posterior sclera that form a right angle with the coronal sections (operation S710).

A specific coronal section when double humps appear on three screens respectively obtained through the coronal scan, the horizontal scan, and the vertical scan at the same time is designated as the location of the fovea (operation S720). Both sides of the optic disc are set based on a BMO, and the center of a straight line connecting the BMO is designated as the location of the optic disc (operation S730). A location when a hyper-reflective Bruch's membrane appears on all of the three screens respectively obtained through the coronal scan, the horizontal scan, and the vertical scan may be designated as the location of the DPE (operation S740)

The TEPS parameter calculator 130 obtains an elevation difference $TEPS_{fovea-DPE}$ between the fovea and the DPE, an elevation difference $TEPS_{disc-DPE}$ between the optic disc and the DPE, and an elevation difference $TEPS_{fovea-disc}$ between the fovea and the optic disc by using location information about the fovea, the optic disc, and the DPE in the posterior sclera (operation S750).

The pathological myopia determiner 140 determines whether a patient has pathologic myopia, by learning at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc through machine learning (operation S760). The machine learning may be performed by an SVM.

FIG. 10 is a table showing a comparison of six ocular measurement indices including four TEPS parameters (indices), an AxL, and an SCT, according to an embodiment of the present disclosure. $TEPS_{fovea \rightarrow disc}$ was not significant between two classes (P=0.924), but it may be seen that a group with pathologic myopia has a much larger standard deviation. (628.17 in pathological myopic eyes and 200.64 in healthy eyes). It may be seen that the standard deviation of a pathologic myopia grade is much larger in each of all four TEPS measurements. (628.17, 325.12, 422.19, and 1730.64). The AxL and the SCT of patients with pathologic myopia were significantly larger (P<0.001), and the six ocular measurement indices may be applied to a machine learning classification model.

FIG. 11 is a table showing Accuracy, Sensitivity, Specificity, and AUROC of SVM classification for each of 11 models according to the present disclosure. Referring to the table shown in FIG. 11, because 86.43% of these eyes were correctly classified compared to 76.36% when only a conventional AxL and a conventional SCT were evaluated, it shows that use of TEPS measurement in detection of pathological myopia is important.

FIG. 12 is a table showing the performance of classification algorithm models of a Kernel SVM, a Decision Tree, a Random Forest, a KNN, and Naive Bayes by using 6 parameters. The present disclosure provides an RBF kernel SVM classifier using a dataset based on ocular posterior sclera tomographic measurements in order to predict presence of pathologic myopia among various types of myopia. Only 6 parameters are needed to produce excellent 90.31% accuracy and 87.12% AUROC. According to the present disclosure, ocular measurement based on OCT is needed, and clinical data such as a patient's age, a patient's visual acuity, or other eyeball or systematic information is not needed. Use of a TEPS has a superior discrimination ability than existing measurement methods, namely, the AxL and the SCT. An SVM-based discrimination system using all six eye features may have a superior discrimination ability, well-balanced sensitivity, and specificity compared to other machine learning algorithms.

Figure 13:
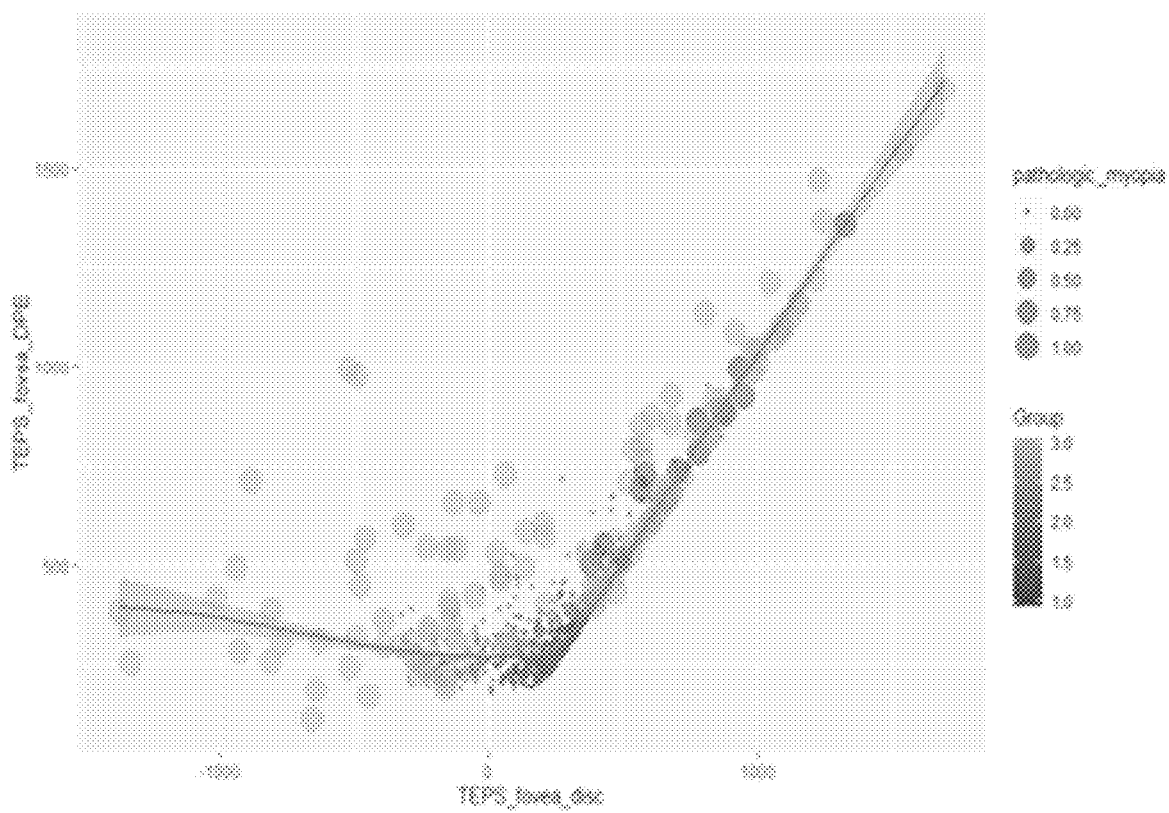
FIG. 13 illustrates a correlation between $TEPS_{fovea-disc}$ and $TEPS_{fovea-DPE}$.

A TEPS according to an embodiment of the present disclosure represents a front-to-rear depth difference between the three landmarks of the posterior sclera in a three-dimensional (3D) plot. FIG. 13 illustrates a correlation between $TEPS_{fovea-disc}$ and $TEPS_{fovea-DPE}$. Because three landmarks are all included in the 3D contour of the posterior sclera, the four TEPS indices have high correlations with each other. Therefore, in each scatter plot composed of two out of the four TEPS indices, dots are gathered as a single line (refer to a blue line formed by small dots in FIG. 13).

Figure 14:
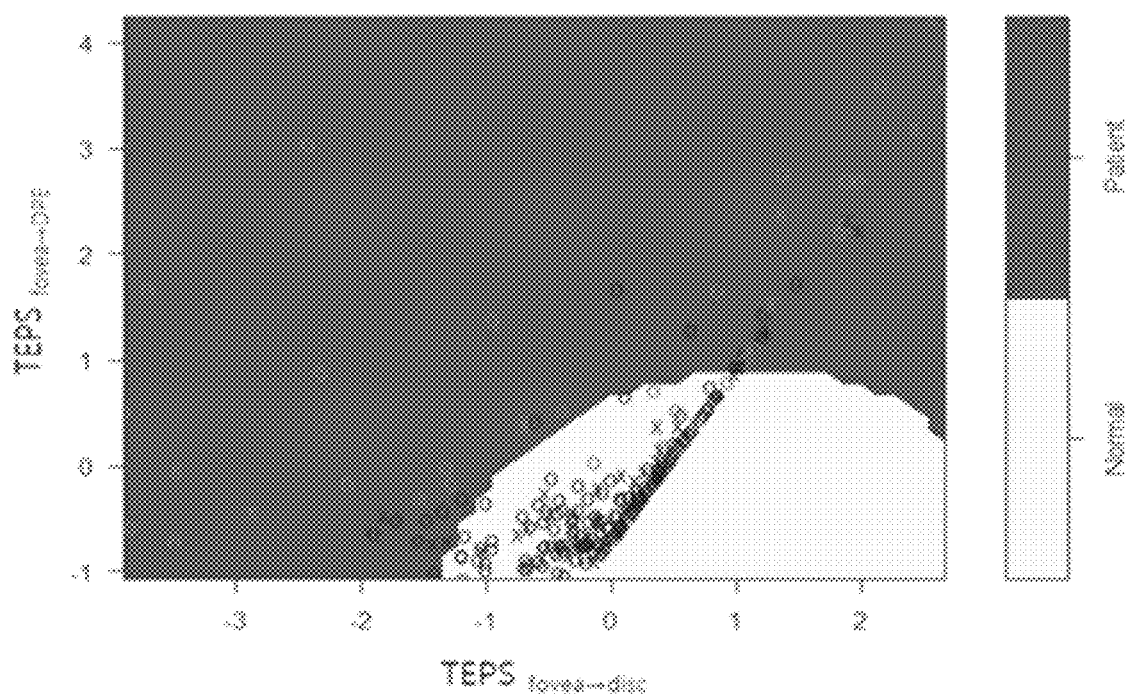
FIG. 14 illustrates a correlation between $TEPS_{fovea-disc}$ and $TEPS_{fovea-DPE}$.

FIG. 14 illustrates a correlation between $TEPS_{fovea-disc}$ and $TEPS_{fovea-DPE}$. In FIG. 14, continuous black dots (healthy eyes) form a major singular line in a yellow (normal) area, and most of red dots (pathological myopia) are spread over several places in a red (patient) area. In other words, an eye with a smooth outline forms a single line (black dots) because a geometric measurements is highly correlated with another line. On the other hand, an eye with an uneven outline will make geometric measurements with singularities on a main correlation line. This is consistent with the definition of a posterior staphyloma. The posterior staphyloma is an outpouching that circumscribes the posterior sclera, and has a smaller radius of curvature compared to the original circle. In a two-dimensional (2D) TEPS plot, a protrusion of the posterior sclera appears as a singular value on a line assembled with a smooth, physiological eye. An SVM classifier using the present disclosure constructed an optimal nonlinear hyperplane for this plot as a crystal surface between different classes, which may be a suitable method for distinguishing structural singular values of the posterior sclera. A polynomial kernel method of an RBF SVM may use a nonlinear hyperplane to distinguish classes suitable for dataset characteristics.

Although the present disclosure has been described with reference to the embodiments shown in the drawings, this is merely an example. It will be understood by one of ordinary skill in the art that various modifications and equivalent other embodiments may be made without departing from the spirit and scope as defined by the following claims.

What is claimed is:

1. A method of determining pathologic myopia by using a geometric structure of a posterior sclera of a fundus, the method comprising:
   obtaining geometric location data about a fovea, an optic disc, and a deepest point of the eye (DPE) in the posterior sclera of the fundus;
   obtaining an elevation difference $TEPS_{fovea-DPE}$ between the fovea and the DPE, an elevation difference $TEPS_{disc-DPE}$ between the optic disc and the DPE, and an elevation difference $TEPS_{fovea-disc}$ between the fovea and the optic disc by using location information about the fovea, the optic disc, and the DPE in the posterior sclera; and
   determining pathologic myopia by using at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc,
   wherein the obtaining of the geometric location of the fovea comprises:
   performing a coronal scan for scanning coronal sections of the posterior sclera from the cornea of an eyeball toward the optic nerve, a horizontal scan for scanning horizontal surfaces of the posterior sclera that form a right angle with the coronal sections, and a vertical scan for scanning vertical surfaces of the posterior sclera that form a right angle with the coronal sections; and
   designating, as the location of the fovea, a coronal section when double humps appear simultaneously on three screens respectively obtained through the coronal scan, the horizontal scan, and the vertical scan.

2. The method of claim 1, further comprising:
   obtaining a vertical distance $TEPS_{distance}$ from the optic disc to the DPE; and
   determining pathologic myopia by using at least two elevation differences selected from among the elevation difference $TEPS_{fovea-DPE}$ between the fovea and the DPE, the elevation difference $TEPS_{disc-DPE}$ between the optic disc and the DPE, the elevation difference $TEPS_{fovea-disc}$ between the fovea and the optic disc, and the vertical distance $TEPS_{distance}$ from the optic disc to the DPE.

3. The method of claim 1, wherein the obtaining of the geometric location of the optic disc comprises:
   performing a coronal scan for scanning coronal sections of the posterior sclera from the cornea of an eyeball toward the optic nerve, a horizontal scan for scanning horizontal surfaces of the posterior sclera that form a right angle with the coronal sections, and a vertical scan for scanning vertical surfaces of the posterior sclera that form a right angle with the coronal sections; and
   setting both sides of the optic disc, based on a Bruch's membrane opening (BMO), and designating the center of a straight line connecting the BMO as the location of the optic disc.

4. The method of claim 1, wherein the obtaining of the geometric location of the DPE comprises:
   performing a coronal scan for scanning coronal sections of the posterior sclera from the cornea of an eyeball toward the optic nerve, a horizontal scan for scanning horizontal surfaces of the posterior sclera that form a right angle with the coronal sections, and a vertical scan for scanning vertical surfaces of the posterior sclera that form a right angle with the coronal sections; and
   designating, as the location of the DPE, a location when a hyper-reflective Bruch's membrane appears on all of three screens respectively obtained through the coronal scan, the horizontal scan, and the vertical scan.

5. A method of determining pathologic myopia by using a geometric structure of a posterior sclera of a fundus, the method comprising:
   obtaining geometric location data about a fovea, an optic disc, and a deepest point of the eye (DPE) in the posterior sclera of the fundus;
   obtaining an elevation difference $TEPS_{fovea-DPE}$ between the fovea and the DPE, an elevation difference $TEPS_{disc-DPE}$ between the optic disc and the DPE, and an elevation difference $TEPS_{fovea-disc}$ between the fovea and the optic disc by using location information about the fovea, the optic disc, and the DPE in the posterior sclera; and
   determining pathologic myopia by using at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc,
   wherein the determining of the pathologic myopia comprises determining whether a patient has pathologic myopia, by learning, through machine learning, at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc.

6. The method of claim 5, wherein the machine learning is a support vector machine (SVM).

7. A system for determining pathologic myopia by using a geometric structure of a posterior sclera of a fundus, the system comprising:
   a tomography unit configured to perform a coronal scan for scanning coronal sections of the posterior sclera from the cornea of an eyeball toward the optic nerve, a horizontal scan for scanning horizontal surfaces of the posterior sclera that form a right angle with the coronal sections, and a vertical scan for scanning vertical surfaces of the posterior sclera that form a right angle with the coronal sections;
   a structure location data collector configured to collect geometric locations of a fovea, an optic disc, and a deepest point of the eye (DPE) in the posterior sclera of the fundus by using images obtained by the tomography unit performing the coronal scan, the horizontal scan, and the vertical scan;
   a TEPS parameter calculator configured to calculate an elevation difference $TEPS_{fovea-DPE}$ between the fovea and the DPE, an elevation difference $TEPS_{disc-DPE}$ between the optic disc and the DPE, and an elevation difference $TEPS_{fovea-disc}$ between the fovea and the optic disc by using location information about the fovea, the optic disc, and the DPE in the posterior sclera; and
   a pathological myopia determiner configured to determine pathologic myopia by using at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc calculated by the TEPS parameter calculator,
   wherein the structure location data collector collects geometric locations of the fovea, the optic disc, and the DPE by designating, as the location of the fovea, a specific coronal section when double humps appear on three screens respectively obtained through the coronal scan, the horizontal scan, and the vertical scan at the same time, designating, as the location of the DPE, a location when a hyper-reflective Bruch's membrane appears on all of the three screens respectively obtained through the coronal scan, the horizontal scan, and the vertical scan, setting both sides of the optic disc, based on a Bruch's membrane opening (BMO), and designating the center of a straight line connecting the BMO as the location of the optic disc.

8. The system of claim 7, wherein the pathological myopia determiner determines whether a patient has pathologic myopia, through machine learning by using, input parameters, at least two elevation differences selected from among the elevation difference $TEPS_{fovea-DPE}$ between the fovea and the DPE, the elevation difference $TEPS_{disc-DPE}$ between the optic disc and the DPE, and the elevation difference $TEPS_{fovea-disc}$ between the fovea and the optic disc, which are calculated by the TEPS parameter calculator.

* * * * *